June 18, 1935.　　　　　J. V. CAPUTO　　　　　2,005,609

DYNAMO ELECTRIC MACHINE

Filed Sept. 8, 1933　　　9 Sheets-Sheet 1

INVENTOR
James V. Caputo
by his attorneys
Byrnes, Stebbins, Parmelee & Blenko

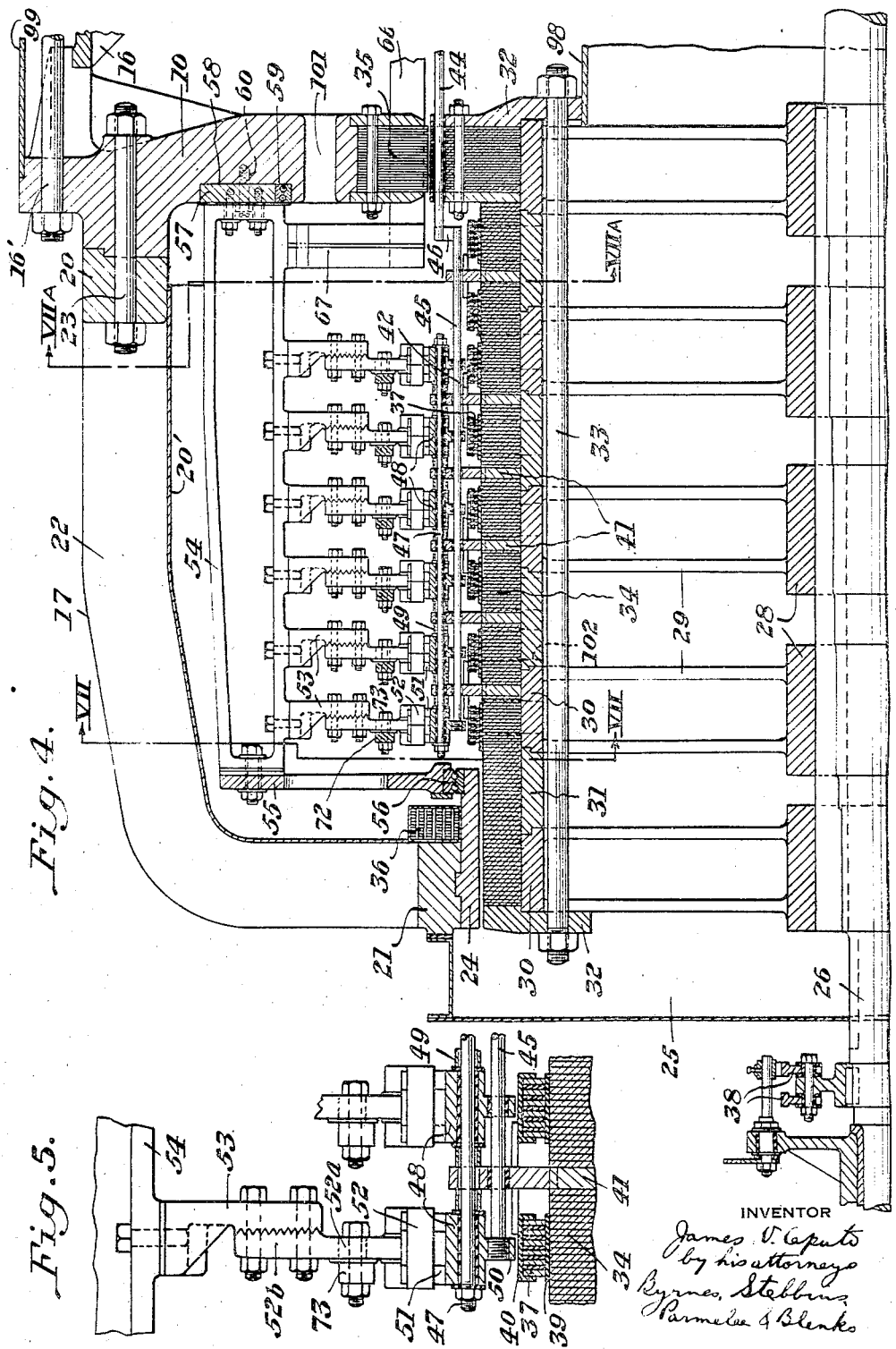

June 18, 1935.                J. V. CAPUTO                2,005,609
                         DYNAMO ELECTRIC MACHINE
                   Filed Sept. 8, 1933      9 Sheets-Sheet 5

INVENTOR
James V. Caputo
by his attorney
Byrnes, Stebbins,
Parmelee & Blenko

June 18, 1935.  J. V. CAPUTO  2,005,609

DYNAMO ELECTRIC MACHINE

Filed Sept. 8, 1933   9 Sheets-Sheet 6

INVENTOR
James V. Caputo
by his attorney
Byrnes, Stebbins, Parmelee & Blenko

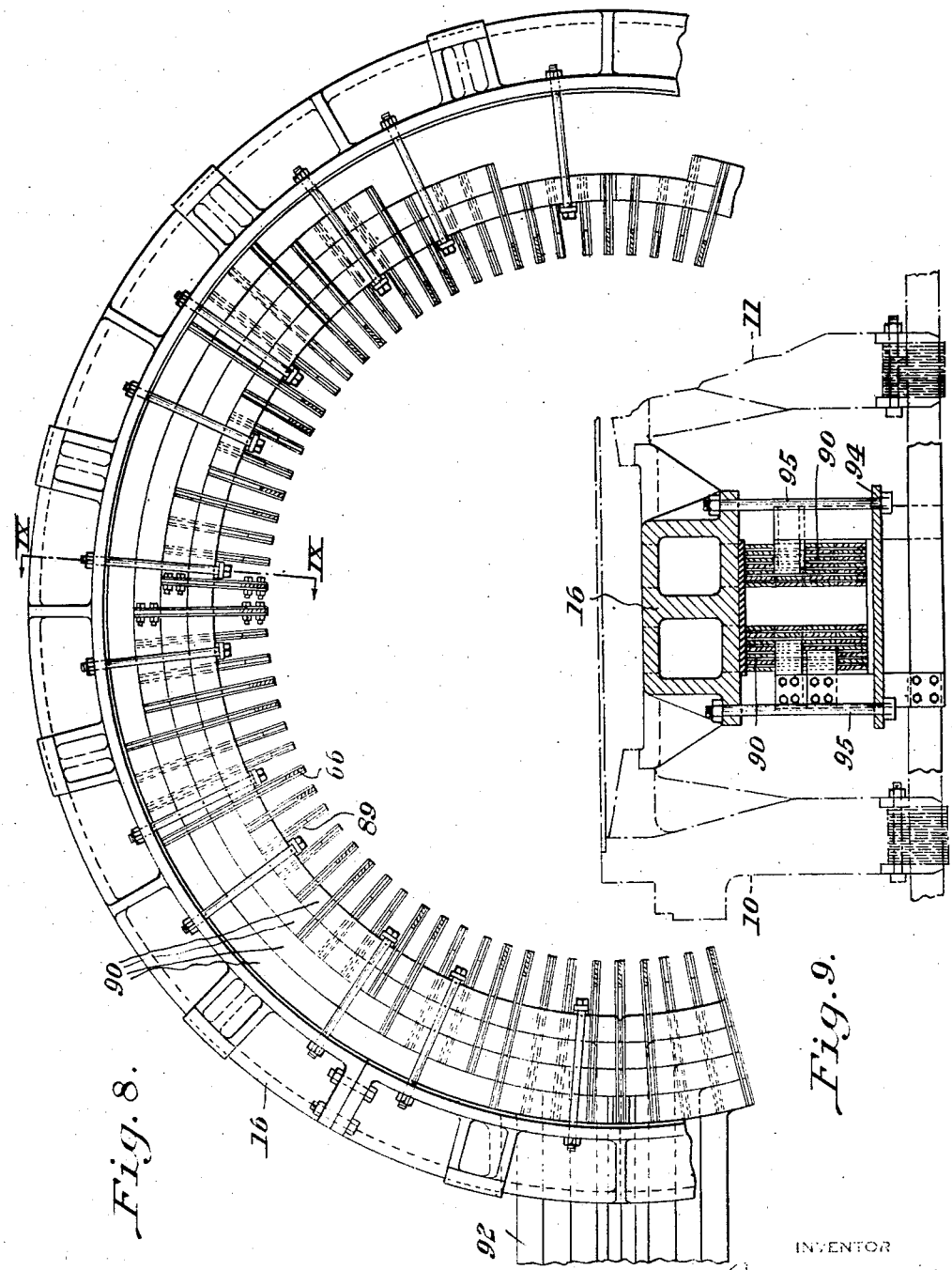

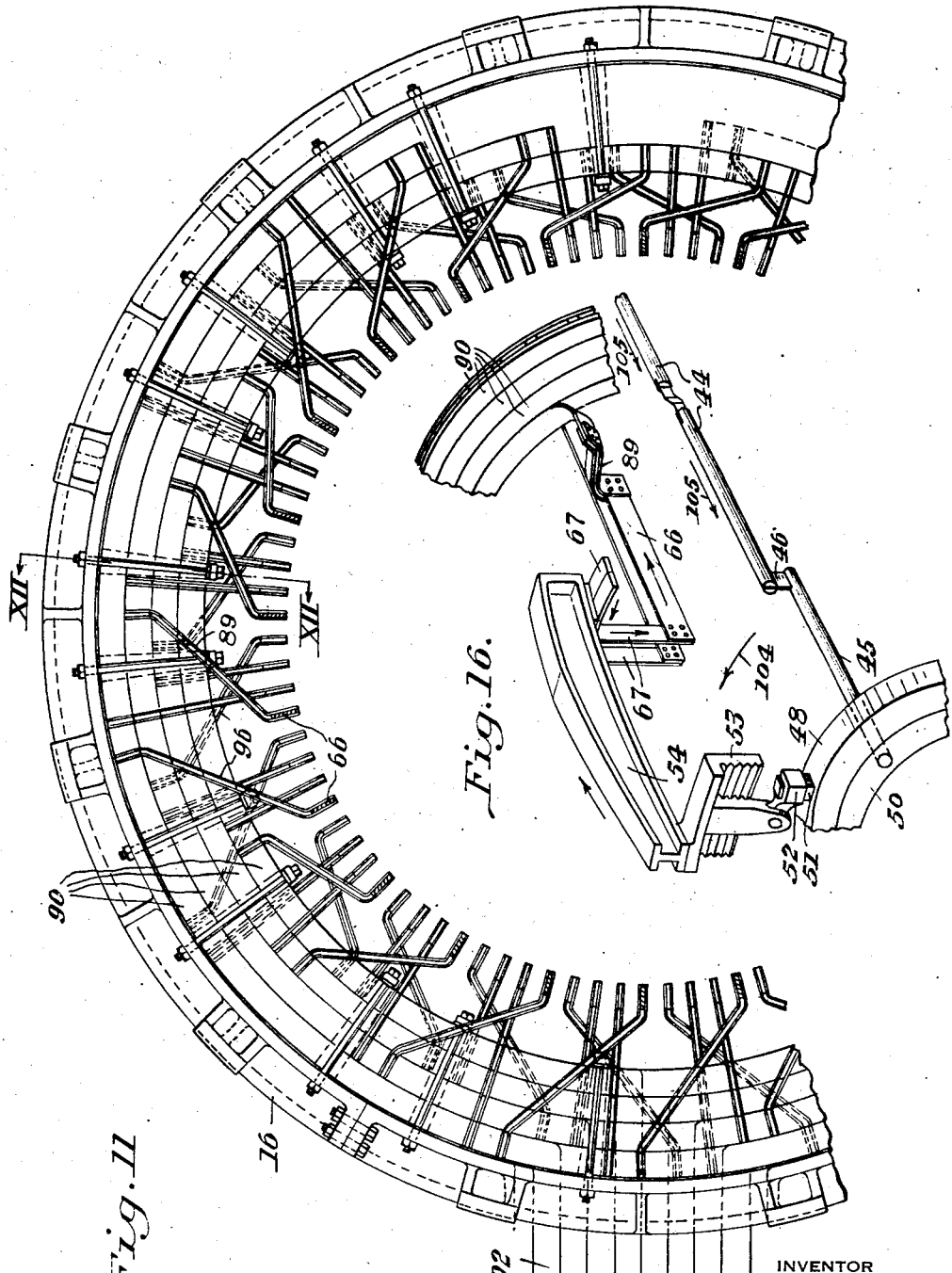

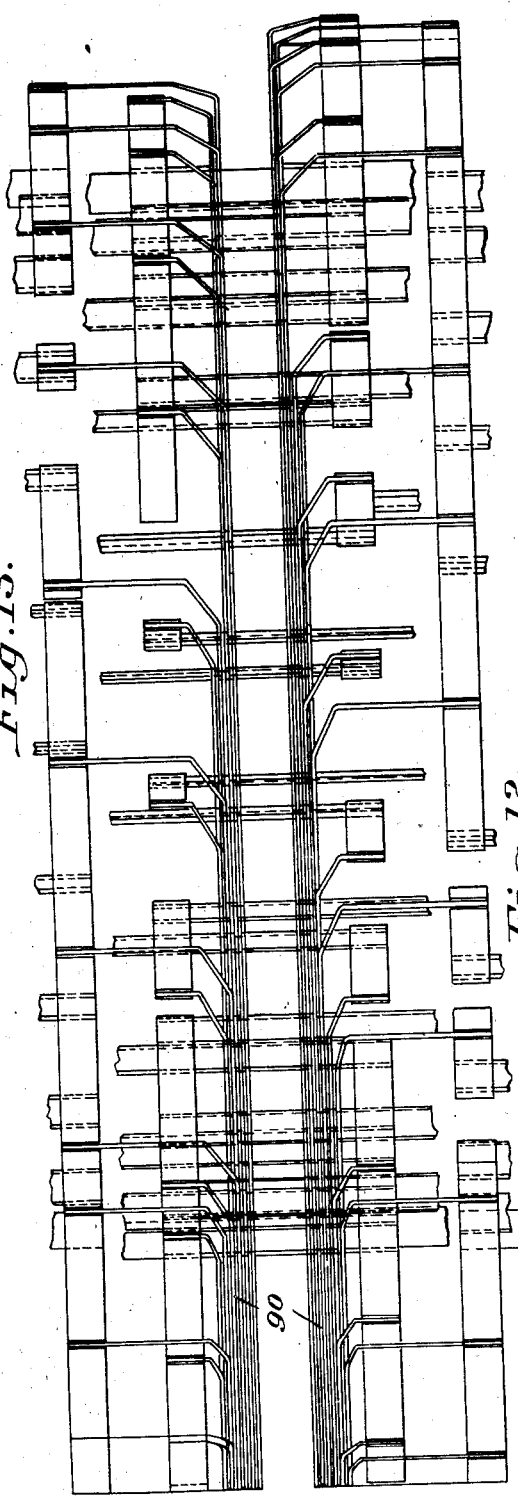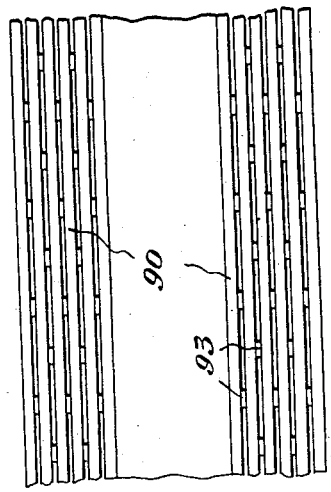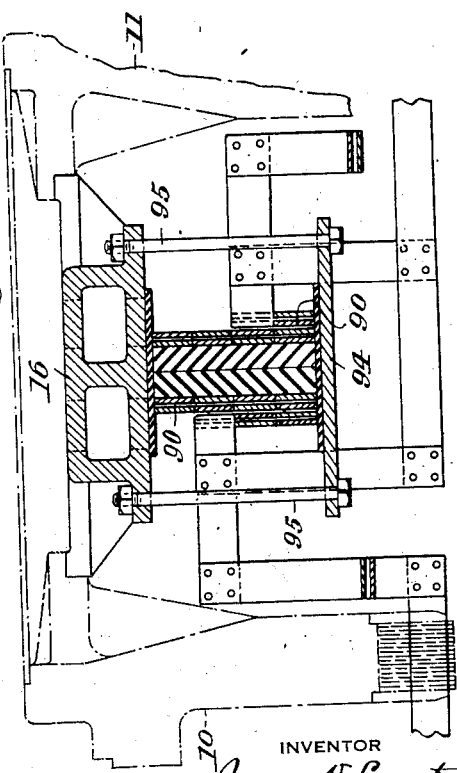

Patented June 18, 1935

2,005,609

UNITED STATES PATENT OFFICE 2,005,609

DYNAMO-ELECTRIC MACHINE

James V. Caputo, Crafton, Pa.

Application September 8, 1933, Serial No. 688,642

63 Claims. (Cl. 171—212)

My invention relates to a dynamo-electric machine and, in particular, to a machine having a very large current capacity at a relatively low voltage.

Many industrial processes require direct currents of large magnitude at low voltage. Examples are electrolytic processes and electric heating and welding. The generation of direct currents of such large magnitude has been attended with considerable difficulty heretofore and has been accomplished with only indifferent success. The usual commutator-type, direct-current generator is totally impractical as a source of heavy, low-voltage current. Rectifiers of various types have also been proposed to produce direct current from an alternating current source. This means for supplying direct current, however, has not met with wide acceptance and there still exists, therefore, an unsatisfied demand for a low-voltage, direct-current generator of large capacity and commercially practical design. It is the object of my invention to satisfy this demand.

The machine of my invention is of the so-called homopolar type which, in its broad aspects, is well known. This type of generator, however, has not been used commercially to any considerable extent because of certain inherent difficulties encountered in the practical operation thereof. These difficulties become multiplied many fold when it is attempted to design a machine along conventional lines having a capacity suitable for the applications which I contemplate, that is, heating and welding, wherein the current demand may be of the order of 200,000 amperes. My invention, therefore, while utilizing the broad principle of the homopolar generator as previously known, involves a radical departure from the conventional design thereof for the purpose of providing a direct-current generator of the indicated capacity.

In accordance with my invention, I provide a pair of annular, magnetic yokes disposed side-by-side in parallel planes and rigidly spaced apart. End bells of generally cup shape are secured to the outer lateral faces of the yokes. A shaft mounted in suitable bearings extends axially through the end bells and yokes. An annular core structure is carried by said shaft for completing toroidal, magnetic circuits, including said yokes and their end bells. Inductors are positioned in said core structure adjacent one of the air gaps in said circuit so as to cut the magnetic flux on rotation of the shaft. Field coils for inducing magnetic flux in the circuit are mounted on the end bells and additional coils are carried on the rotating core structure.

The current induced in the aforementioned inductors on rotation of the shaft is conducted axially of the shaft to slip rings secured thereto, from which it is collected by brushes disposed symmetrically about the rings and supported on the cores and end bells but insulated therefrom. The current is conducted through the brush-supporting structure to the space between the cores and thence circumferentially and radially of the latter by suitable terminal connections, to the load to be supplied.

Further features of my invention will become apparent in the course of the following detailed description of a present preferred embodiment thereof, for a more complete understanding of which reference is made to the accompanying drawings. In the drawings:—

Figure 4 is a partial sectional view along the line IV—IV of Figure 2;

Figure 5 is a view similar to Figure 4 illustrating only a portion thereof to enlarged scale;

Figure 8 is a partial sectional view along the line VIII—VIII of Figure 2;

Figure 9 is a sectional view along the line IX—IX of Figure 8;

Figure 10 is a plan view of the circumferential and radial connections between the inductors and the machine terminals;

Figure 11 is a view similar to Figure 8 showing a modified form of construction;

Figure 12 is a sectional view along the line XII—XII of Figure 11;

Figure 13 is a view similar to Figure 10 showing the connections of Figure 11 in plan;

Figure 14 shows a portion of the connections of Figures 10 and 13 to enlarged scale;

Figure 16 is a schematic diagram illustrating the path of the current through the machine.

Figure 1:
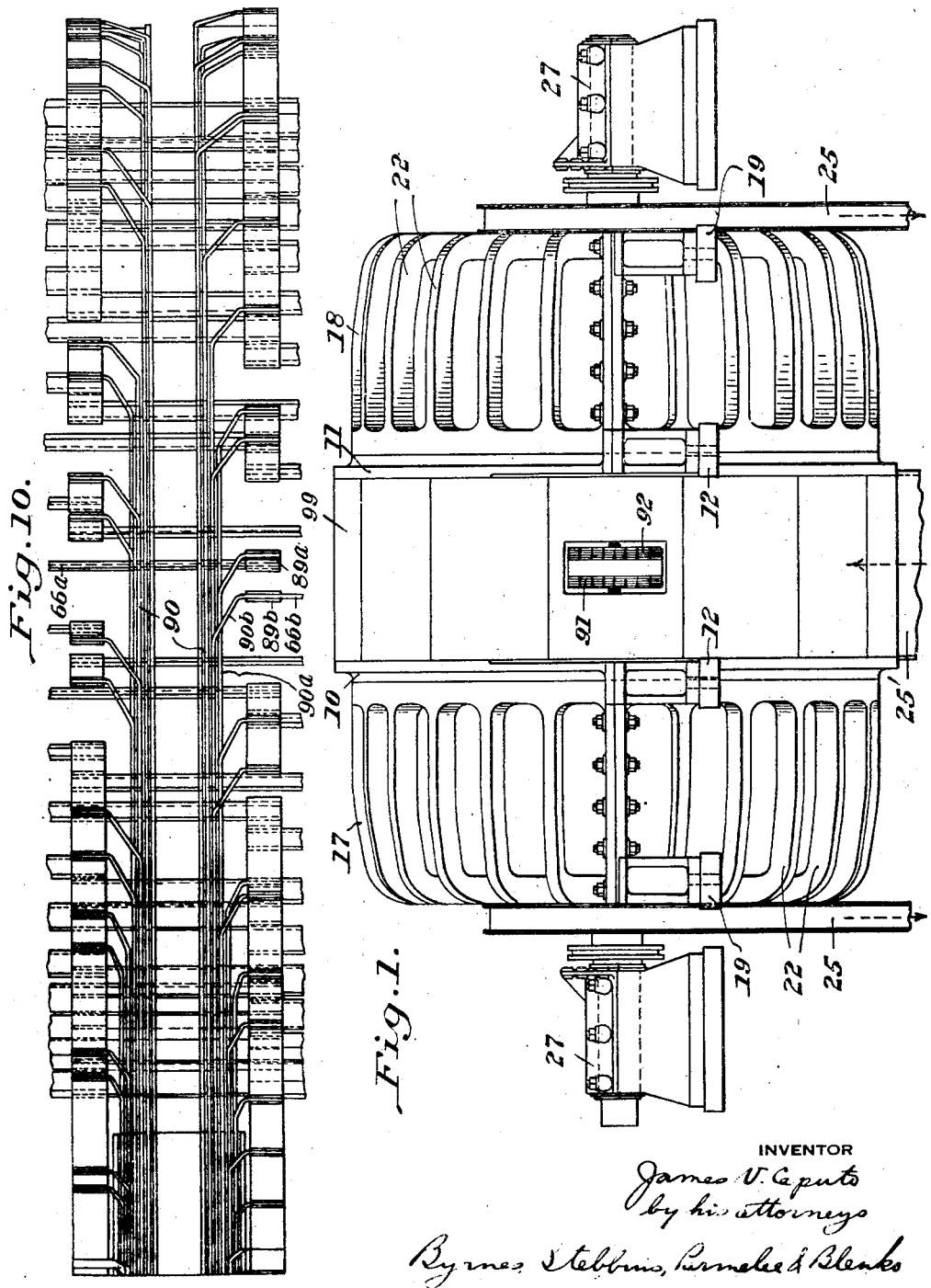
Figure 1 is a side elevation of the machine constructed in accordance with the invention, illustrating simply the exterior appearance thereof.
Figure 2:
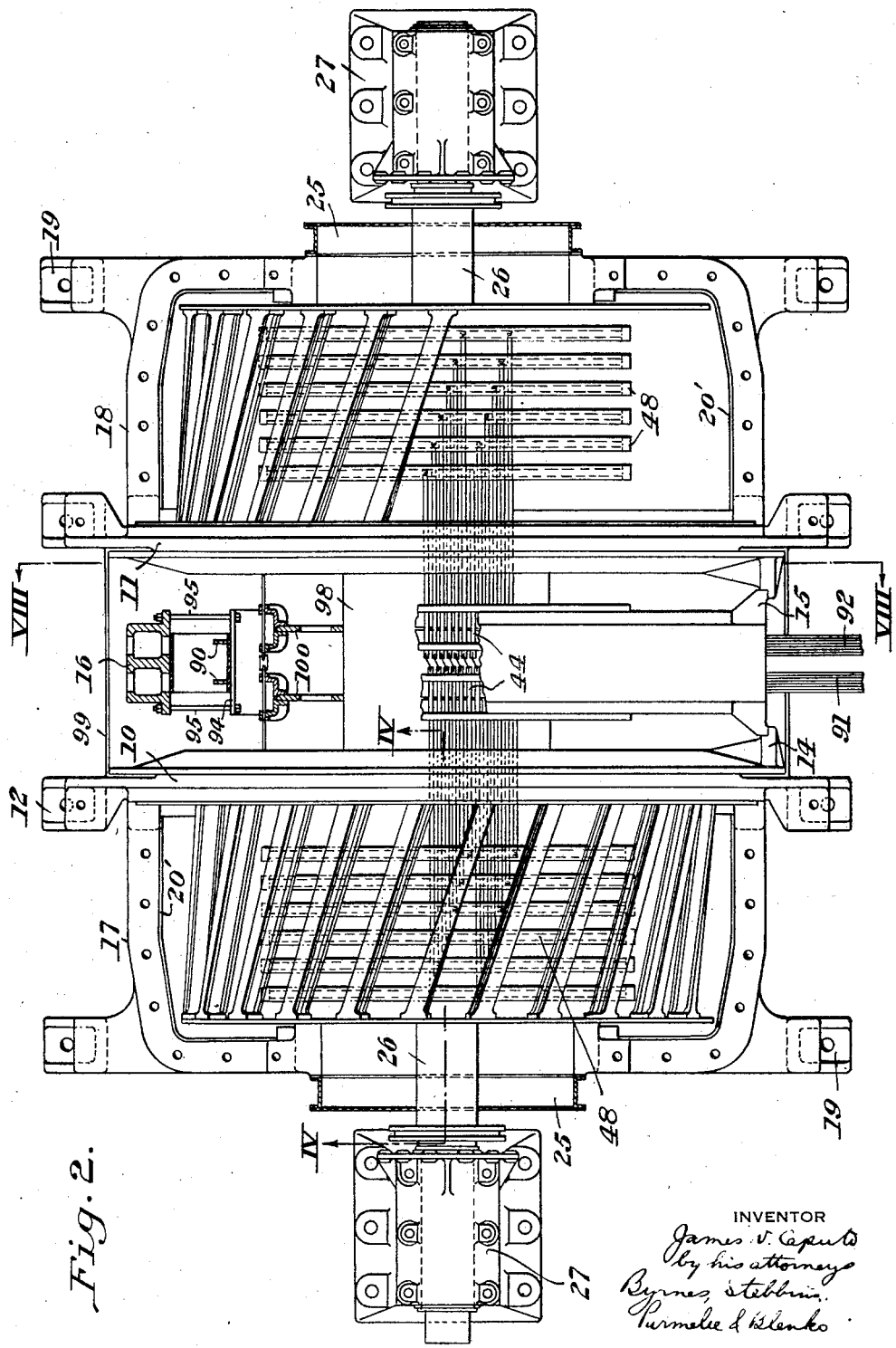
Figure 2 is a plan view of the machine with the upper halves of the end bells removed, portions being shown in section and other parts being omitted for the sake of clearness.

Referring now in detail to the drawings, the machine as a whole, as shown in Figures 1 and 2, comprises yokes 10 and 11 having supporting feet 12 thereon adapted to rest on any suitable foundation structure. Projections 14 extend from each yoke toward the other for cooperation with feet 15 extending radially of a central ring casting 16 which, together with bolts 16', rigidly spaces the yokes apart in parallel, side-by-side relation. End bells 17 and 18 extend outwardly from the yokes and are divided along a horizontal line for convenience in manufacture and maintenance. The lower halves of the end bells have feet 19 which sustain a portion of the weight of the machine. As shown more particularly in Figure 4, the end bells comprise hubs 20 and 21 connected by integral, spaced arms 22. The hubs 20 fit on to the lateral faces of the yokes 10 and 11 and are secured thereto by bolts 23. The bells are encased interiorly by sheet metal 20'. A bushing 24 is set into the bore of the hub 21. Outlet air ducts 25 extend upwardly toward the end bells and terminate adjacent the hubs 21 in openings communicating with the bushing 24, whereby cooling air may be circulated through the interior of the machine. An inlet duct 25' enters the inter-yoke space.

A shaft 26 is journaled in bearings 27 disposed coaxially with the yokes and end bells. A plurality of rings 28 are keyed on to the shaft in spaced relation axially therealong. Spokes 29, preferably structural shapes welded to the rings 28, project radially therefrom and, at their outer ends, carry rims 30, the spokes being also welded to the rims. Between adjacent rims 30, rings 31 are positioned, the entire assembly being secured together by end rings 32 and bolts 33. The assembly just described constitutes a cylindrical supporting structure and clamping means for core laminations 34, which have a dove-tailed fit thereon.

The yokes 10 are provided with stationary, annular, laminated cores 35. The laminations 34 adjacent the inner clamping ring 32 extend radially of the shaft into close proximity to the laminations of the core 35, defining a small air gap therebetween. The laminations 34 adjacent the outer clamping ring 32 (at the left in Figure 4) are only slightly spaced from the bore through the bushing 24, thus defining a second air gap. A complete magnetic circuit of toroidal shape is thus provided, on each side of the machine. A stationary field winding 36 is disposed about the bushing 24 adjacent the hub 21 of each of the end bells. Rotating field windings 37 surround the annular core provided by the laminations 34. These windings are connected to an excitation source through slip rings 38 carried on the shaft 26. As shown in Figure 5, each of the windings 37 is wound of strap on edge about an insulated sleeve 39. Spaced strips of insulation 40 overlie the windings 37. Discs 41 are spaced along the length of the annular core provided by the laminations 34, between adjacent field windings 37. The discs 41 are composed of two annular pieces, the inner being magnetic and the outer being non-magnetic. This permits unobstructed flow of flux axially of the rotary core but avoids the induction of flux in the outer edges of the discs, which would result if it were of magnetic material, because of the current traversing adjacent members.

Pins 42 driven through the discs 41 engage the windings 37 and hold them tightly on the core 34. Inductors 44 extend through the laminations adjacent the clamping ring 32 and are insulated therefrom. Slip ring connectors 45 extend parallel to the inductors 44 through holes in the discs 41, being insulated therefrom. Short, radial straps 46 connect the inductors 44 to the connectors 45. Supporting rods 47 also extend through the discs 41 and are insulated therefrom. Slip rings 48 are supported on said rods and insulated therefrom, each slip ring being spaced from the adjacent disc 41 by sleeves 49. The slip rings 48 have inwardly projecting bosses 50. The connectors 45 traverse and are insulated from the bosses 50 of all the slip rings except one. As shown in Figure 5, each connector 45 has electrical conducting engagement with the boss 50 on one slip ring, by being screwed or otherwise secured thereto. The connectors associated with successive inductors have electrical contact with successive slip rings, as shown more particularly in Figure 2. The inductors 44 on opposite sides of the central plane perpendicular to the axis of the shaft 26, are staggered for a purpose which will appear later.

Figure 3:
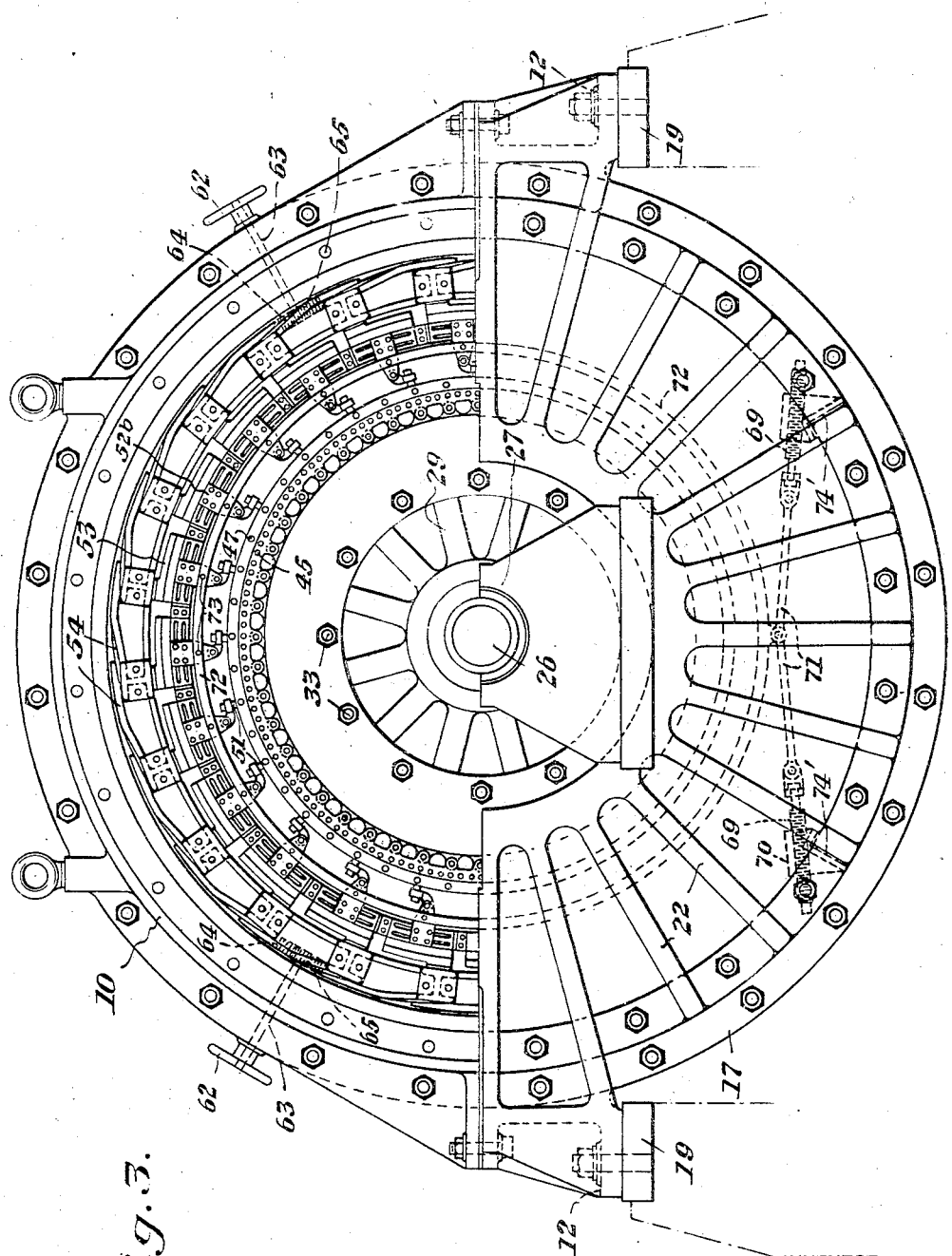
Figure 3 is an end view of the machine with the upper half of the near end bell removed.
Figure 7:
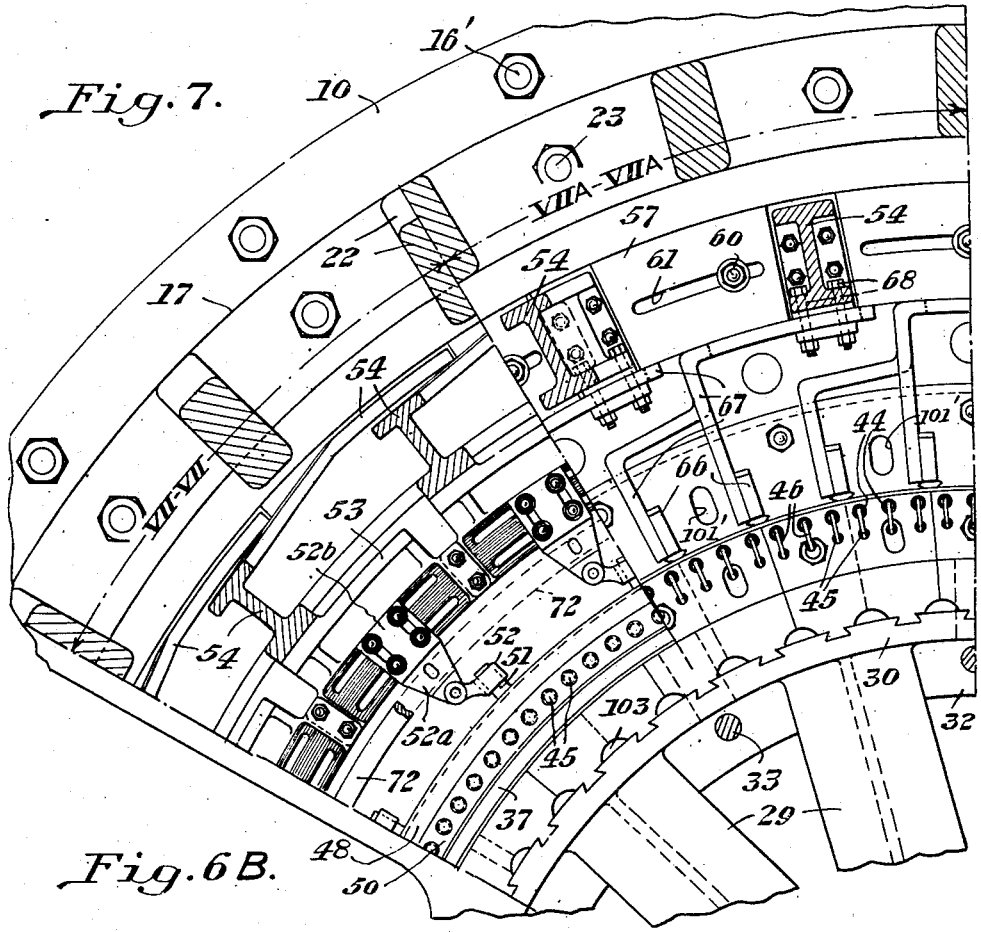
Figure 7 is a composite sectional view, the indicated portions of which are taken along the lines VII—VII and VII—A—VII—A of Figure 4.

The brushes 51 are carried in brush-holders 52 which are adjustable pivotally on fingers 52a. The fingers 52a project inwardly from blocks 52b which are adjustable circumferentially on brackets 53. The brackets 53 are secured either by brazing or bolting to spirally disposed supporting arms 54. The brackets 53 associated with each slip ring are bolted together at their ends, as shown in Figures 3 and 7, each bracket being insulated from the adjacent bracket to which it is connected. The arms 54 are bolted at one end to a plate 55, and insulated therefrom. The plate 55 is rotatable on a bearing 56 carried at the inner end of the bushing 24. The other ends of the arms 54 are bolted to but insulated from a ring 57 which is adjustably secured in a recess 58 on the outer lateral face of one of the cores. The ring 57 is rotatable on a bearing 59 and is secured in adjusted position by means of studs 60 extending through slots 61 in the ring. Hand wheels 62 mounted on shafts 63 extending radially through the yokes, are provided for adjusting the entire brush rigging. For this purpose, the ring 57 carries racks 64 and pinions 65 on the shaft 63 are in mesh therewith.

From the foregoing, it will appear that each of the arms 54 collects current from all the slip rings on the same side of the machine and that each of the slip rings is connected in succession to one of a plurality of successive inductors on one side of the machine equal in number to the number of the slip rings. It will also be observed that the points of connection of the successive inductors to the slip rings lie substantially below the associated arm 54 on the left-hand side of the machine, as shown in Figure 2, but that on the right-hand side of the machine, the points of connection of the inductors to the slip rings lie on a line intermediate to adjacent arms 54. This arrangement of connections reduces to a minimum the change in the resistance of the circuits of the individual inductors on rotation of the shaft, as will be explained further hereafter.

To compensate for armature reaction, or the effect of the current traversing the inductors 44 in distorting the normal flux, I provide conductors 66 in the shape of bars extending through the core 35, for carrying current therethrough in a direction opposite that of the current flowing in the inductors. The bars 66 are connected by risers 67 to the inner ends of the arms 54 by bolts 68. The bent-over ends of the risers 67 are slotted to permit a change in the circumferential distance between the bars 66 and the point of connection of the risers extending therefrom to the arm 54. The bolts 68, of course, must be loosened when it is desired to adjust the entire brush rigging by means of the hand wheels 62.

In addition to the means provided for simultaneously adjusting the entire brush rigging, I also provide screw shafts 69 working in threaded abutments 70 and connectible successively by links 71 to rings 72. The projecting fingers 52a of the brush-holders associated with each slip ring are mechanically connected to one of the rings 72 by means of bolts 73. The rings 72, however, are insulated from the brush-holder. The abutments 70 are slidable on ways 74' so that the links 71 may be connected to any one of the rings 72. The ends of the screw shafts 69 are squared for receiving a crank or wrench. By this apparatus, it is possible to adjust all the brush-holders associated with one slip ring simultaneously. The bolts clamping the blocks 52b to the brackets 53, of course, must be loosened before the adjustment is made.

Figure 6:
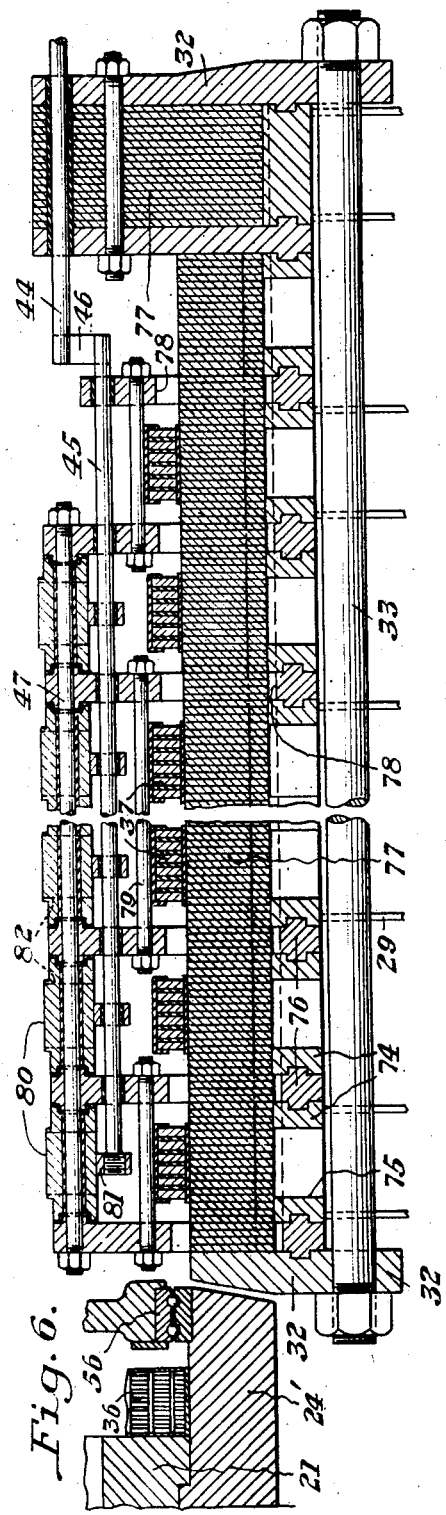
Figure 6 is another view similar to Figure 4 illustrating a modification of a different portion thereof to enlarged scale.

Referring now to Figure 6, illustrating a modified form of the annular field core and distributed winding, rings 74 are welded to the spokes 29 projecting from the hubs 28. The rings 74 have radial holes 75 formed at intervals in their circumference. Between adjacent rings 74, discs 76 are disposed and a laminated core 77 is laid up on the cylindrical structure formed by the assembled rings 74. The discs 76 have holes 78 therein which permit the laminations to extend continuously through the discs and provide a magnetic circuit of low reluctance. A bushing 24' seated within the hub 21 of the end bell extends the metallic magnetic circuit to a point close to the lateral face of the left-hand clamping plate 32, leaving only a small air gap therebetween to be traversed by the flux. The core structure of Figure 6, however, may be modified so that its left-hand air gap is constituted as in Figure 4, if desired.

The field winding sections 37 of Figure 6 are held in place by studs 79 extending between adjacent discs 76. The remaining details of the modification of Figure 6 are similar to those of the construction of Figure 4, with the exception of differences which will be apparent from a study of the drawings. Slip rings 80 are assembled between the discs 76 and insulated therefrom, the assembly being clamped together by the through bolts 47. The connectors 45 extend through the discs 76, being insulated therefrom, and similarly through lugs 81 brazed to the rings 80, having threaded connection with the lug of only one ring. The edges of the rings 81 are milled out to provide recesses 82 at intervals around their circumference.

Figure 6A:
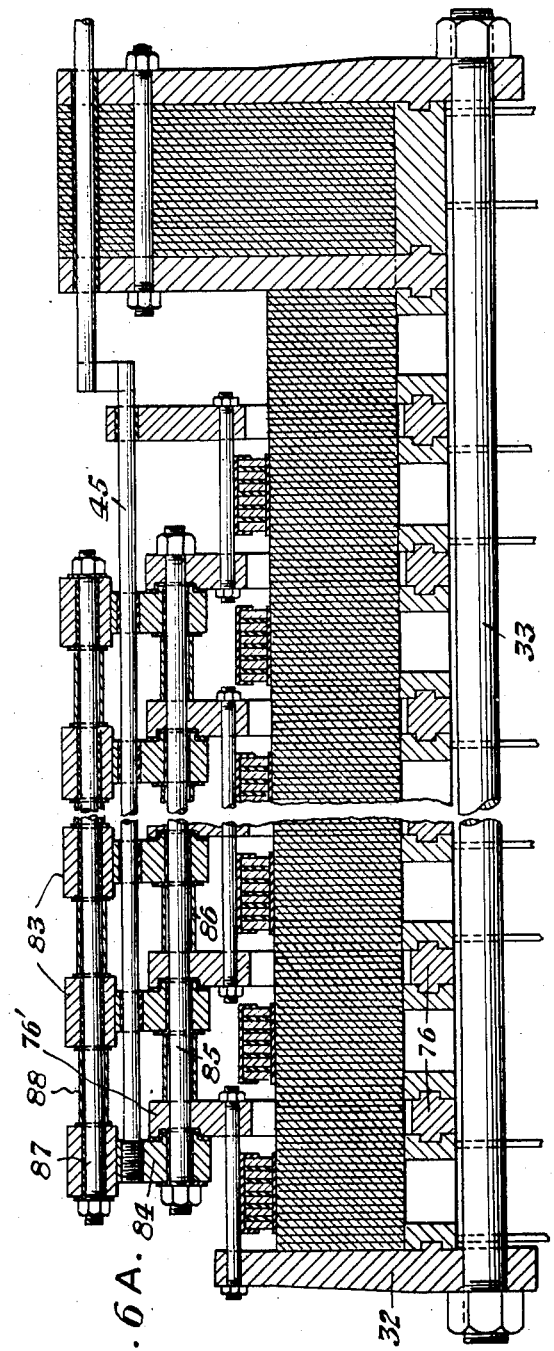
Figure 6A is a view similar to Figure 6 showing a still further modification.

Figure 6A illustrates a further modification of the construction of the core and slip ring assembly, which is similar to that of Figure 6 except in the mounting of the slip rings. Slip rings 83 have lugs 84 extending inwardly therefrom for seating against radial lugs 76' which extend outwardly from the discs 76, through bolts 85, and spacer sleeves 86 maintaining parts of the assembly in proper relation. Connectors 45' extend through the lugs 84 of all but one of the rings and are insulated therefrom, having threaded connection and electrical contact with the lug of the one excepted ring. The rings 83 themselves are secured together by through bolts 87 and spaced apart by spacer sleeves 88. This slip ring construction facilitates removal of the rings from their supporting structure. When the through bolts 85 and 87 have been removed, the rings 83 may be rotated slightly so that the lugs 84 thereon line up with the spaces between the lugs 76' of the disc 76. The rings may then be withdrawn axially for repair or renewal.

Referring now to Figures 8, 9 and 10, the bars 66 constituting the pole face winding, have risers 89 extending radially therefrom. The risers 89 are bolted or brazed to the out-turned ends of circumferentially extending bars 90.

It will be understood that the bars 66 extending inwardly from opposite sides of the machine are of opposite polarity. In order to insure complete neutralization of the flux induced by the currents traversing the inductors 90, I connect adjacent conductors which are equally distant radially from the shaft 26 to bars 66 having opposite polarities. This manner of connection will be obvious from an inspection of Figures 9 and 10. The risers 89, therefore, may extend radially of the bars 66 on the near or far side of the space between the cores 10 and 11, the bar 66 being dimensioned accordingly. As a specific example, in Figure 10, the bar 66a extends across the inter-yoke space beneath the assembled conductors 90, and has risers 89a connected to a circumferential conductor 90a. The adjacent conductor 90b is connected by its risers 89b to a bar 66b of a polarity opposite that of bar 66a. In this way, the individual conductors constituting the machine terminals indicated at 91 and 92 are of opposite polarity and in inter-leaved relation. The considerable reactance in the terminal leads which would otherwise exist because of the large currents carried thereto, is thus practically entirely eliminated. The conductors 90, as shown in Figure 14, are spaced apart laterally by insulating members 93. The assembled conductors are supported, as shown in Figure 9, from the central ring 16 by bars 94 and bolts 95, the conductors being insulated from both the ring and the bars.

In a modified form of construction, illustrated in Figures 11, 12 and 13, the connections between the bars 66 and the conductors 90 are effected by risers 96, some of which, instead of extending radially from the bars, extend circumferentially of the machine to a limited extent, for a purpose which will be explained later. It will be noted that the circumferentially extending risers 96 on each side of the machine are all bent in the same direction from the radial position, and that the risers on opposite sides of the machine are deflected in the opposite direction. The inter-leaving of the circumferential conductors 90 of opposite polarity is preserved in the modification of Figures 11, 12 and 13. It will be apparent that conductors 90 spaced successively at greater radial distances from the shaft may be made of opposite polarity, as well as the arrangement previously described, according to which the laterally adjacent conductors are of opposite polarity. In the embodiments of the invention shown, since the circumferential bars in the same plane perpendicular to the axis of the shaft are of the same polarity, no insulation therebetween is necessary.

Figure 6B:
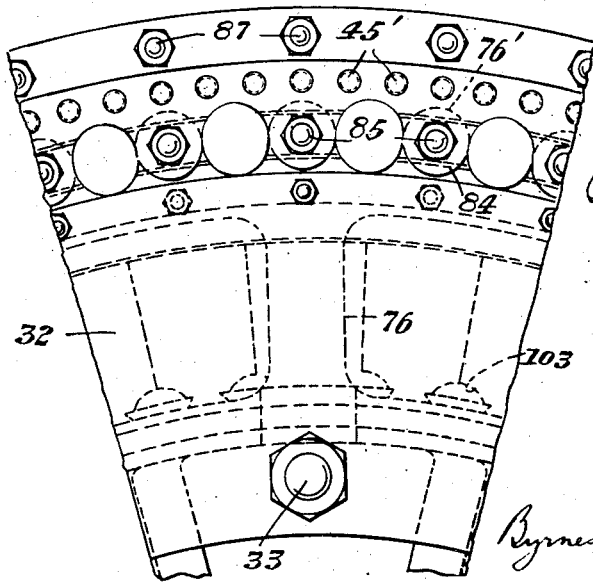
Figure 6B is a partial end view of the core assembly of Figure 6A.
Figure 15:
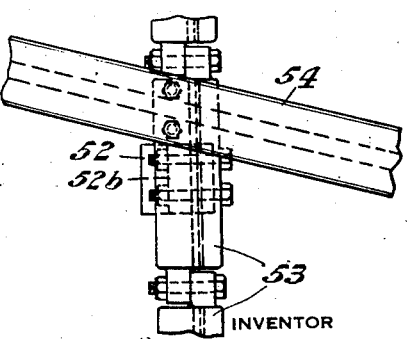
Figure 15 is a partial plan view of the brush-supporting structure.

Cooling air is supplied to the central part of the machine through the duct 25'. A sleeve 98 extends between the two sections of the rotor and with a shell 99 formed by plates extending around the yokes 10 and 11, forms an annular space containing the circumferential terminal leads and the inner ends of the inductors 44. Discs 100 carried on the sleeve 98 support the inner ends of the inductors. The cooling air passes from the annular space between the sleeve 98 and the shell 99 through holes 101 cored in the yokes 10 and 11 and thence into the slip ring space and also through axial holes 101' in the core 34. The spaces between the arms 22 of the end bells are closed by the casing 20', to confine the cooling air to the interior of the machine. The air flows over and around the brush rigging and thence over the distributed field winding, through the annular core and thence out through ducts 25. The path of the air through the core may best be seen in Figures 4 and 7. Openings 102 extend radially through the core 34 and the rings 31 at intervals around their circumference. The laminations 34, furthermore, are cut away at 103 to provide axial ducts for the passage of cooling air through the core. This construction may be observed more clearly in Figure 6B. It will be noted that the laminations 34 do not extend into contact with the solid portions of the discs 76 between the holes 78 thereof but terminate short of said solid portion, providing a passage therearound connecting the slip ring space with the holes 74 in the rings 75. Within the thickness of the discs 76, the laminations are segmental and of such size and shape as not to fill the holes 78 entirely. The cooling air passes between the slip rings 83 of Figure 6A, or the milled-out edges 82 of the slip rings 80 and, through the passage just described to the interior of the rotor.

The construction described herein provides for a compounding of the excitation to maintain a predetermined voltage regardless of increased load, the extent of compounding being adjustable within a considerable range. The compounding is effected by the spiraling of the arms 54, the circumferential length of the brackets 53, the circumferential length of the bent-over ends of the risers 67, and the circumferential length of the bent risers 96 connecting the bars of the pole face windings to the circumferential terminal conductors. While none of these portions of the circuit constitute complete turns linking the magnetic circuit, each such portion of the circuit makes a partial turn, at least, about the magnetic circuit and thus affects the flux traversing the latter.

In order that the voltages induced in the inductors 44 in the two halves of the machine be in the same direction, the flux traversing the annular cores on the rotors must be in opposite directions, so that the air gap flux on both sides of the machine is unidirectional. This means that the directions of the exciting currents traversing the field windings 36 and 37 must be opposite on opposite sides of the machine.

Figure 16 illustrates diagrammatically the electro-magnetic relations of the various portions of one-half of one of the plurality of parallel paths through the machine. For the purpose of explanation, it may be assumed that the field current is in the direction of the arrow 104. If the rotor is driven in the proper direction, a voltage will be induced in the inductors 44 in the direction of the arrows 105. If the load circuit is completed, current will flow through the inductors 44, thence through the connectors 45, to the slip ring 50 and thence through the brushes 51, the brush-holders 52 and the brackets 53. The latter extend circumferentially of the core and thus constitute a portion of a turn therearound. The flow of current through the brackets 53 on both sides of the machine is in the same direction as the field current. The same is true of the current flowing through the arm 54 on the far side of the machine (not shown in Figure 16). The effect of the current in the arm 54 on the near side of the machine opposes that of the field current as shown in Figure 16. A differential effect on the field flux is thus created. On passing from the arm 54 through the bent-over ends of the riser 67, the current again proceeds circumferentially of the field circuit, in the same direction as the field current, to an extent determined by an adjustment of the brush rigging. After passing through the bar 66 of the pole face winding, the current traverses the riser 89 and thus further aids the main field flux. The passage of the current through the circumferential terminal conductors 90 has no effect on the flux in the magnetic field since these conductors are interleaved. After passing through the load, the current returns through the circumferential terminal conductors 90, the risers 89, pole face windings 66 and the riser 67 of the opposite side of the machine. The current then passes through the arm 54 and thence divides among the brackets 53 secured thereto, whence it returns to the inductors 44 through the brushes.

It will be apparent that the magnetic effect of the various portions of the individual circuit traced on the magnetic circuit of the machine may be varied by the adjustments described to produce the desired degree of compounding of the field flux. Figure 16 shows plainly that the curernt in certain portions of the power circuits aids the field current and opposes it in other sections. The net effect is determined by the degree of spiraling of the arms 54, the adjustment of the entire brush rigging, and the extent of deflection of the risers 96. Where radial risers 89 are employed, of course, they do not produce any substantial effect on the magnetic circuit.

It will be apparent that the generator of my invention is characterized by numerous advantages over apparatus of this type as known heretofore. In the first place, all parts of the machine are readily accessible for making adjustments and repairs, as well as for inspection and cleaning. This is particularly true of the brush rigging. The machine is designed, furthermore, to facilitate assembly of the various parts into a completed whole. The rotor construction is sturdy, preventing any possibility of loosening of the rings or the rotating field coils mounted thereon. A more important advantage is the equalization of the ohmic drop in the individual parallel paths of the power current.

Since the brushes are symmetrically disposed about the slip rings, there is very little change in the resistance of the power circuits as the rotor turns. This change is further minimized by having the points of connection of each individual pair of conductors connected in series, staggered between adjacent brushes so that the maximum change in resistance of each individual circuit is equal only to one-half the resistance of one of the rings between adjacent brushes thereon. This resistance, of course, is so small as to be practically negligible.

The interleaving of the power conductors with the resulting reduction in reactance has already been mentioned, as well as the effect of the pole face windings in overcoming rotor reaction, and the disposition of the power circuits to provide an adjustable degree of compounding. The brush rigging may be easily adjusted as a unit or the brushes of each ring may be adjusted individually. Provisions are made for effecting cooling of the various parts which are apt to become heated in operation. As a result of the foregoing advantages, circulating currents and excessive heating are practically eliminated. The ventilating ducts extending radially through the annular cores do not preclude continuity of the magnetic circuit, the only air gaps being those at the ends of the bore.

The distributed field windings reduce leakage flux and rotor reaction. The balance ohmic drop above mentioned prevents the occurrence of any irregularities in the terminal voltage and the latter is maintained steadily at a predetermined value at all times.

The location of the terminal leads between the yokes is highly desirable. The end bells, furthermore, may be of the continuous, closed type instead of the open arm type with a casing between the arms. Access to the brush rigging is not obstructed by the terminal leads, as in the ordinary generator. Expansion of the inductors under load is permitted by the flexible connection between the conductors of each pair of connecting sources.

While I have illustrated and described herein but one preferred embodiment of the invention, with certain modifications thereof, it will be apparent that numerous changes in the construction disclosed may be made without departing from the spirit of the invention or the scope of the appended claims.

I claim:

1. In a homopolar generator, a magnetic yoke, an annular core coaxial therewith mounted for rotation relative to said yoke, a plurality of field windings distributed axially of said core, inductors embedded in said core for cutting the flux passing through the core and yoke, slip rings carried on said core, and connections between said inductors and said slip rings.

2. In a homopolar generator, a toroidal, magnetic circuit including a yoke, an end bell and an annular core arranged coaxially, the core being mounted for rotation relative to the yoke and bell, field windings distributed axially of said core, inductors carried in the core, slip rings on the core and connections between the inductors and the slip rings.

3. In a homopolar generator, a toroidal, magnetic circuit, including a yoke, an end bell, and an annular core, the core being mounted for rotation relative to the yoke and bell and separated therefrom by air gaps, inductors embedded in said core, field windings distributed along the length of the core, slip rings carried on said core and connections between the inductors and slip rings.

4. In a homopolar generator, a pair of spaced yokes, end bells attached to said yokes, and a pair of annular cores coaxial with and rotatable relative to said bells and yokes, and separated therefrom by air gaps, field windings distributed along the lengths of said cores, inductors on said cores, slip rings surrounding said cores having connections to said inductors, circumferential terminal leads between said yokes, and connections between said leads and slip rings.

5. In a homopolar generator, a stator comprising a yoke having an end bell secured thereto, a rotor including an annular core coaxial with said yoke and bell, inductors carried on said core, slip rings on said rotor connected to said inductors, and field windings distributed along said core.

6. In a homopolar generator, a toroidal, magnetic circuit including a yoke, an end bell secured thereto, and an annular core coaxial with and rotatable relative to said yoke and bell, and field windings distributed along the length of said core.

7. In a homopolar generator, a pair of spaced yokes, end bells attached to said yokes, and annular cores coaxial with and rotatable relative to said yokes and bells, constituting therewith a pair of toroidal magnetic circuits, field windings distributed along said cores, inductors in said cores, slip rings rotating therewith, and circumferential terminal leads between said yokes connected to said slip rings.

8. In a homopolar generator, a toroidal, magnetic circuit including a yoke, an end bell, an annular core rotatable relative to said yoke and bell, field windings distributed along said core, inductors and slip rings on said core, conducting arms extending laterally of said yoke, and brushes carried by said arms for engaging each of said slip rings.

9. In a homopolar generator, a magnetic circuit comprising a yoke, an end bell, an annular core rotatable relative to said yoke and bell, inductors and slip rings on said core, a plurality of conducting arms extending from said yoke toward said bell, a disc on the bell and a ring on the yoke for supporting said arms for rotation, and brush-holders carried on said arms having brushes for engaging said slip rings.

10. In a homopolar generator, a yoke, a core rotatable relative to said yoke, field windings embracing the core and distributed along the length thereof, inductors on said core and slip rings rotating therewith connected to said inductors, conducting arms extending along said core, and brush-holders adjustable on said arms circumferentially of said core, for holding brushes in conducting engagement with said slip rings.

11. The apparatus set forth in claim 10, characterized by an adjusting ring connected to all the brush-holders of a given slip ring, and means for shifting said adjusting ring to move all said brush-holders simultaneously to the same extent circumferentially of said core.

12. The invention set forth in claim 10, wherein there are brackets attached to said arms for adjustably supporting said brush-holders.

13. In a homopolar generator, a shaft, an annular core disposed thereon, field windings distributed along said core, inductors embedded therein, said core having a plurality of discs formed therein, slip rings supported on said discs, and connections between said inductors and said slip rings.

14. In a homopolar generator, a shaft, abutting rings carried on said shaft, discs seated on said rings in spaced relation, an annular core assembled on said rings and between said discs, inductors embedded in said core, slip rings carried on said discs, and connections from each inductor to one slip ring, said connections being insulated from all other slip rings than the one to which it is connected.

15. In a homopolar generator, a plurality of abutting rings, discs disposed thereon in spaced relation, an annular core built up of laminations assembled on said rings and between said discs, field windings distributed along said core and between said discs, and means extending through said discs for securing the field windings onto the core.

16. In a homopolar generator, a shaft, a plurality of rings carried thereon, said rings having circumferentially spaced holes therethrough, a plurality of discs between adjacent rings, said discs having holes therethrough, and laminations assembled on said rings and between said discs, said laminations extending through the holes in said discs and spaced from the solid portions of the discs between the holes to provide communication between the exterior of said core and the holes in said rings.

17. In a homopolar generator, a shaft, a plurality of rings mounted on said shaft, discs between said rings extending outwardly thereof, said discs having lugs extending outwardly thereof, a core assembled on said rings between said discs, field windings for said core, inductors embedded in said core, and slip rings surrounding said core, said slip rings having lugs extending inwardly thereof whereby the rings may be bolted to the lugs on said discs, the slip ring lugs being adapted on partial rotation of the slip rings to pass between the disc lugs on movement of the slip rings axially of the discs.

18. In a homopolar generator, a stationary yoke, a core coaxial with and rotatable relative to said yoke, being separated therefrom by an annular air gap, a magnetizing winding distributed along the core for causing magnetic flux to cross said air gap, inductors embedded in said core, pole face conductors embedded in said yoke, and connections including slip rings and brushes between said inductors and pole face conductors.

19. The combination set forth in claim 18, wherein the said connections also include arms extending laterally of said yoke, brush-holding brackets on said arms, and risers attached to said arms and pole face conductors, said brackets and risers extending circumferentially of said core.

20. In a homopolar generator, a yoke, a core rotatable relative thereto, a distributed field winding on the core, inductors in said core, slip rings rotating with said core and connected to said inductors, brushes engaging said rings, and terminal leads extending circumferentially of said core and connected to said brushes.

21. The combination set forth in claim 20, wherein adjacent circumferential terminal leads are connected to brushes of opposite polarity.

22. In a homopolar generator, a stationary yoke, a rotatable core having inductors therein, slip rings rotatable with said core, conducting arms extending spirally around and along said core, and brushes supported on said arms for engagement with said slip rings.

23. In a homopolar generator, a pair of spaced, parallel, stationary yokes, a shaft extending therethrough, cores on said shaft, and inductors in said cores, the inductors of one core being staggered relative to the inductors of the other core.

24. The apparatus set forth in claim 23, wherein said cores are provided with slip rings, and connections between the slip rings and inductors, including brush-holder arms extending along the cores from the yokes, the points of connection of the inductors of one of said cores to its slip rings being staggered relative to the points of connection of the inductors of the other core to their slip rings.

25. In a homopolar generator, a pair of parallel yokes, end bells attached to said yokes, cores coaxial with and rotatable relative to said yokes and bells, inductors in said cores, terminal leads extending circumferentially of said cores between said yokes and outwardly from therebetween, and connections between said inductors and said terminal leads.

26. In a dynamo-electric machine, a plurality of spaced yokes and a plurality of annular cores rotating relative to said yokes, said yokes and annular cores forming toroidal magnetic circuits, said cores having field windings distributed therealong.

27. In a dynamo-electric machine, means for generating a relatively low-voltage, high-amperage current, including means for producing a unidirectional field having an annular air gap and an inductor traversing said gap, generator terminal leads connected to said inductor, said leads being so disposed relative one to another as to have a compounding effect on said field.

28. In a homopolar generator having an annular air gap and inductors rotating therethrough, slip rings rotating with said inductors and connected thereto successively, a plurality of brush-supporting arms, said arms having a spiral conformation to overlie the connections of the slip rings to successive inductors.

29. In a homopolar generator, a circular yoke, a core rotatable within said yoke including a shaft coaxial with the yoke, spokes extending from said shaft, rings secured to said spokes and an annular laminated core built up on said rings.

30. In a homopolar generator, a circular yoke, a core rotatable within said yoke including a shaft, annular laminations secured thereto, supporting discs interposed between the core laminations at intervals, and slip rings supported on but insulated from said discs.

31. The apparatus defined by claim 30 characterized by inductors embedded in a portion of said core, and connections from the inductors to the slip rings extending through said discs.

32. In a homopolar generator, a circular yoke, a core rotatable within said yoke including a shaft, annular laminations secured thereto, supporting discs interposed between the core laminations at intervals, rods extending through said discs and slip rings supported on said rods.

33. In a homopolar generator, a pair of axially spaced yokes, a spacing ring between said yokes, terminal leads extending axially of the yokes and then circumferentially thereof, and means securing the circumferentially extending portions of said leads to said ring.

34. In a homopolar generator, a pair of axially spaced yokes, a plurality of terminal leads extending axially of said yokes into the space therebetween and then circumferentially of the yokes, the circumferentially extending portions of said leads being so disposed that adjacent leads are of opposite polarity.

35. In a dynamo-electric machine, a yoke, a rotor so disposed within the yoke as to leave an air gap therebetween, means for maintaining a substantially uniform flux distribution circumferentially of the air gap including terminal leads extending from opposite ends of the rotor in magnetic relation with the yoke.

36. In a dynamo-electric machine, a yoke, a rotor so disposed within the yoke as to leave an air gap therebetween, inductors on the rotor adapted to cut lines of force traversing the air gap, and means for causing the induction of substantially equal voltages in all said inductors, including terminal leads extending from opposite ends of the rotor in magnetic relation with said yoke effective to provide a uniform flux distribution circumferentially of the air gap.

37. The apparatus defined by claim 35 characterized by current-collecting means disposed about said rotor at points of substantially equal potential.

38. The apparatus defined by claim 35 characterized by a plurality of current-collecting means disposed in pairs at points on the rotor between which the impedance is substantially equal.

39. The apparatus defined by claim 35 characterized by said leads being so disposed as to compensate for rotor reaction.

40. A dynamo-electric machine comprising a rotor, an annular core thereon composed of stacked laminations, supporting discs spaced along said core between said laminations, said discs having openings spaced circumferentially thereof, certain of said laminations extending through said openings and spaced from the edges thereof.

41. A dynamo-electric machine comprising a yoke, a rotor mounted for rotation therein, inductors spaced circumferentially of the rotor, slip rings spaced axially of the core on both sides of the inductors, and connections between the inductors and the rings, the inductors connected to the near rings on one side being connected to the far rings on the other side, whereby the circuits of all inductors between rings are of substantially equal length, said circuits being connected in parallel.

42. The apparatus defined by claim 41 characterized by current-collecting means disposed about said rotor at points of substantially equal potential.

43. The apparatus defined by claim 41 characterized by a plurality of current-collecting means disposed in pairs at points on the rotor between which the impedance is substantially equal.

44. A dynamo-electric machine comprising a yoke, a rotor mounted for rotation in said yoke, inductors on said rotor adapted to cut a magnetic field crossing the air gap between the yoke and the rotor, and means inducing such a magnetic field including a magnetizing coil mounted on said rotor for rotation therewith.

45. The apparatus defined by claim 44 characterized by additional field producing coils disposed in inductive relation with said yoke.

46. A dynamo-electric machine comprising a yoke, a rotor mounted for rotation therein, inductors on said rotor, and current-collecting means cooperating with said inductors including slip rings mounted on the rotor, brushes engaging the slip rings, and conducting members in contact with the brushes spaced circumferentially of the rotor and extending generally axially thereof to form a substantially continuous cage about a portion of the rotor.

47. In a homopolar generator, a stationary yoke, an end-bell extending axially thereof, and supporting feet extending downwardly from said end-bell, a core coaxial with and rotatable relative to said yoke, being separated therefrom by an annular air gap, a magnetizing winding for causing magnetic flux to cross said air gap and flow axially of said end-bell, inductors embedded in said core, pole face conductors embedded in said yoke, and connections including slip rings and brushes between said inductors and pole face conductors.

48. The apparatus defined by claim 47 characterized by said connections being so disposed as substantially to neutralize the reactance of the rotor inductors.

49. A dynamo-electric machine comprising a yoke, a rotor mounted for rotation therein, inductors on the rotor, slip rings on the rotor connected to said inductors, brush-supporting arms cooperating with said slip rings, and compensating windings connected in series with said arms and in inductive relation with said rotor and yoke.

50. The apparatus defined by claim 49 characterized by said arms extending from opposite ends of the rotor toward the yoke, in inductive relation with the rotor, whereby substantially to neutralize the reactance of the machine.

51. A dynamo-electric machine comprising a yoke, a rotor rotatable therein, inductors mounted on the rotor, slip rings on the rotor connected to said inductors, brush arms cooperating with said rings, and pole face conductors embedded in said yoke and connected to said arms, said arms and windings being in inductive relation with the rotor and yoke, thereby substantially neutralizing the inductance of the machine.

52. A dynamo-electric machine comprising a yoke, a rotor mounted for rotation therein, inductors on said rotor, and current-collecting means cooperating with said rotor including relatively stationary conductors disposed about said rotor in the form of a cage, and in inductive relation therewith.

53. The apparatus defined by claim 52 characterized by pole face windings embedded in the yoke and connected to said conductors.

54. A homopolar generator comprising a yoke, an end-bell extending axially therefrom, a rotor rotatable within the yoke and bell, inductors on the rotor, and means for collecting current therefrom including a plurality of conducting arms extending generally axially of the yoke and spaced circumferentially thereof, a disc spaced axially from the yoke for supporting the outer ends of the arms, and brushes carried by said arms.

55. A homopolar generator comprising a yoke, a core mounted for rotation therein, inductors on the core, brush arms extending axially of the yoke, slip rings on the core cooperating with said arms, and pole face windings embedded in said yoke connected to said arms, said arms and windings being so disposed relative to said core as to exert magnetomotive force therein.

56. A dynamo-electric machine comprising a yoke, a rotor mounted for rotation within the yoke, inductors on the rotor, current-collecting means cooperating with said inductors, and pole face windings embedded in said yoke, said current-collecting means and pole face windings being connected and disposed in inductive relation with the rotor whereby to maintain the impedance thereof substantially uniform.

57. A dynamo-electric machine comprising a yoke, a rotor mounted for rotation within the yoke, inductors on the rotor, and means for causing magnetic flux to cross the air gap between the yoke and the rotor, including field windings distributed axially of the rotor whereby the leakage of magnetic flux therefrom is reduced.

58. A dynamo-electric machine comprising a yoke, a rotor mounted for rotation therein, inductors disposed generally axially of the rotor, current-collecting means cooperating with said rotor including brush arms extending generally axially of the yoke and pole face windings connected thereto and embedded in the yoke whereby the current induced in the inductors flows through the brush arms and pole face windings in a direction opposite that in which it flows in the inductors themselves.

59. A homo-polar generator comprising a shaft, an annular core mounted thereon, field windings distributed along the core, inductors carried on the core, and current-delivery means on said core, said inductors being connected to said current-delivery means.

60. A dynamo-electric machine comprising a pair of yokes spaced apart axially, a rotor extending through and mounted for rotation within said yokes, means for causing a magnetic field to cross the air gap between the yokes and rotor, inductors on said rotor adapted to cut said field, and terminal leads for said inductors disposed in the space between said yokes.

61. A dynamo-electric machine comprising a yoke, a rotor mounted for rotation in said yoke, means for producing a magnetic field crossing the air gap between said yoke and rotor, inductors on said rotor, and means for collecting the current induced in said inductors, including terminal leads extending outwardly from the yoke in side by side relation and uniformly distributed circumferentially of the yoke, whereby the current in said leads affects the flux in said field uniformly at all points therearound.

62. The apparatus defined by claim 61 characterized by said radial leads extending further substantially to a common point adjacent the machine for connection to the load.

63. A dynamo electric machine comprising a yoke, a core mounted for rotation therein, inductors on the core, a current collecting cylinder rotating with said core and connected to said inductors, brush arms cooperating with the cylinder and extending longitudinally thereof, terminal leads connected to said arms and extending radially and circumferentially of said yoke, a ring carried by said yoke, and means on said ring for supporting said leads.

JAMES V. CAPUTO.